United States Patent [19]
Kintner et al.

[11] 3,831,628
[45] Aug. 27, 1974

[54] CHECK VALVE
[76] Inventors: Edwin K. Kintner, 1929 Elmbrook Ln., Pittsburgh, Pa. 15243; C. Edward Titley, 9685 Highland Rd., Pittsburgh, Pa. 15237
[22] Filed: Mar. 13, 1973
[21] Appl. No.: 340,733

[52] U.S. Cl....... 137/512.15, 137/512.5, 137/515.7, 137/525.3, 137/525.5, 137/527
[51] Int. Cl............................................. F16k 15/14
[58] Field of Search......... 137/512.15, 512.4, 515.3, 137/515.5, 515.7, 515, 525.3, 525.5, 525.7, 527, 527.2, 527.4, 527.6; 251/228, 298, 299, 303

[56] References Cited
UNITED STATES PATENTS

| | | | |
|---|---|---|---|
| 106,433 | 8/1870 | Van Keuren | 137/512.15 |
| 654,321 | 7/1900 | O'Crowley | 137/512.15 |
| 2,800,920 | 7/1957 | Smith | 137/512.15 |
| 3,074,427 | 1/1963 | Wheeler | 137/515.7 X |
| 3,514,076 | 5/1970 | Wheatley | 251/298 X |
| 3,538,946 | 11/1970 | Hilsheimer | 137/515.5 X |

FOREIGN PATENTS OR APPLICATIONS

| | | | |
|---|---|---|---|
| 16,154 | 7/1911 | Great Britain | 137/525.3 |
| 478,432 | 6/1929 | Germany | 251/228 |

*Primary Examiner*—Robert G. Nilson

[57] ABSTRACT

A check valve comprising a flat ring, a diametrically extending support mounted thereacross for supporting a rubber diaphragm. The outer peripheral portion of the diaphragm is normally seated on the inner peripheral portion of the ring. Thus, fluid pressure effects pivotal flexing of the diaphragm adjacent said support to open the valve. Stiffening segments are fastened to substantially semi-circular portions of the diaphragm. The ring is supported by a plurality of bolts extending through connecting flanges of two pipes along a circular path of greater diameter than the outer diameter of the pipes. The outer periphery of the ring rests on and is centered by the shanks of the bolts. By adding spacing rings the check valve may be laterally withdrawn without the necessity of separating the connected flanges of the pipes. A manually operated shut-off valve may be added.

4 Claims, 24 Drawing Figures

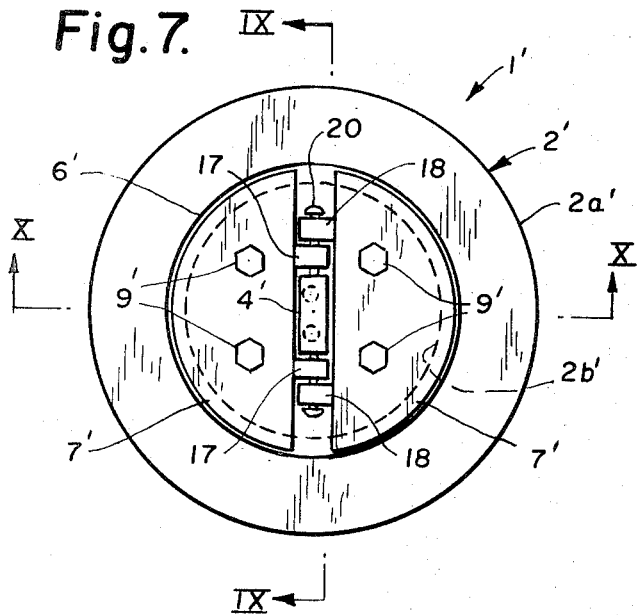
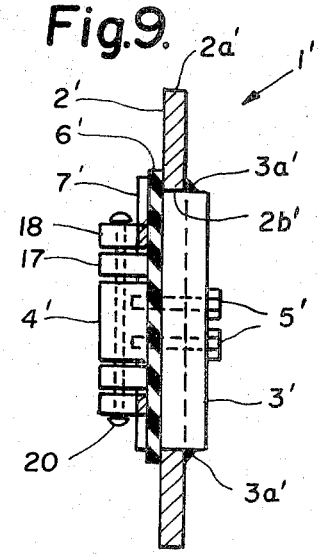
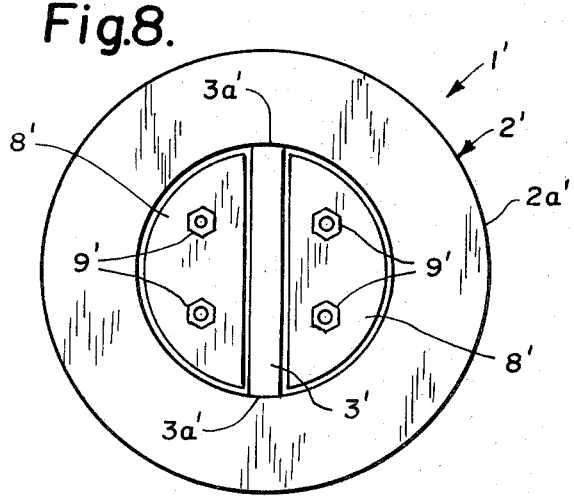
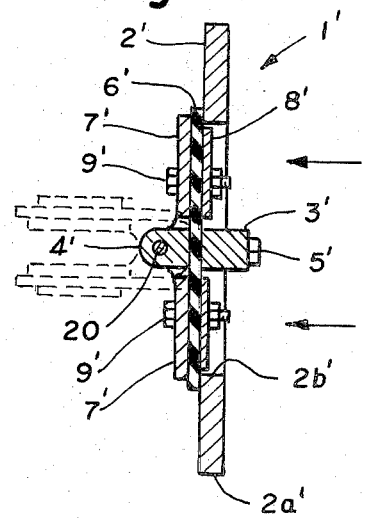
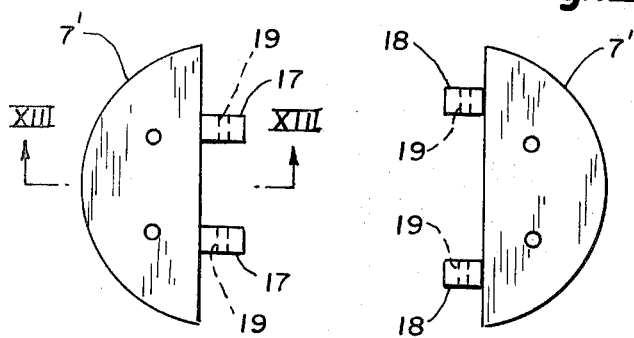
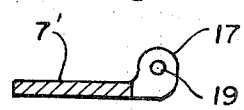

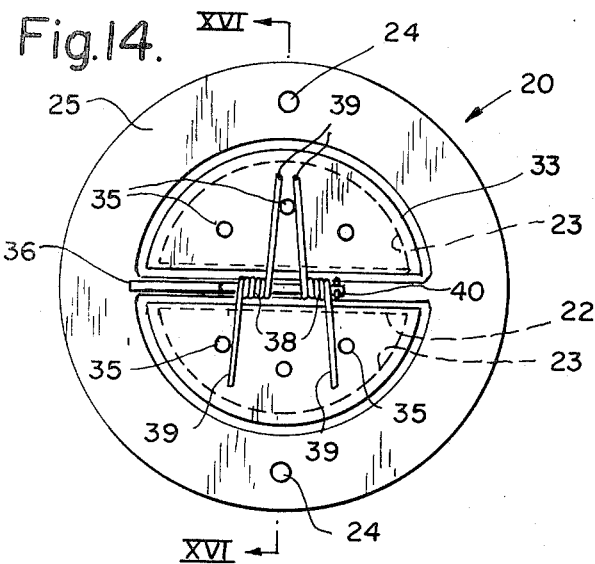
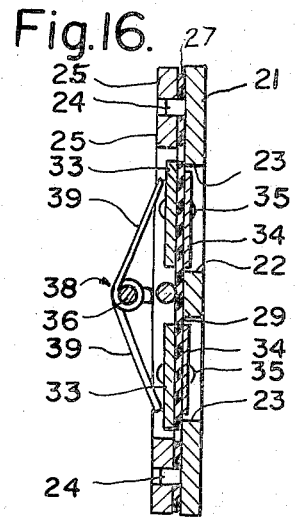
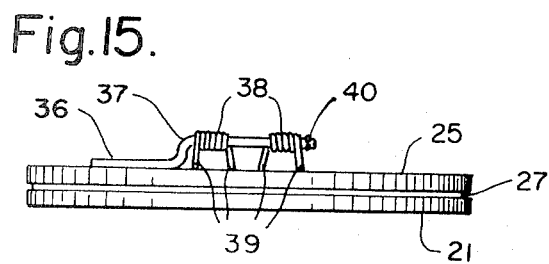
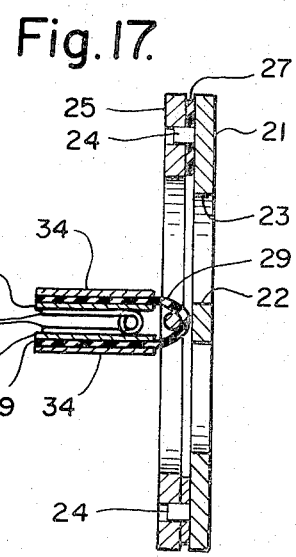
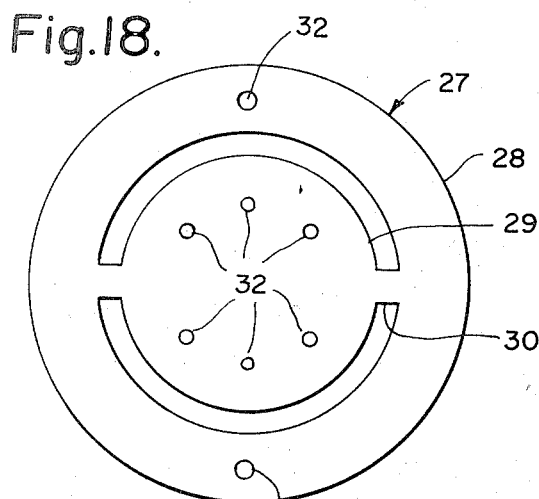

1

CHECK VALVE

This invention relates to check valves, and, more particularly, to those for controlling the flow of fluids in industrial applications.

An outstanding disadvantage of conventional industrial check valves is that they are relatively complicated in construction, costly to maintain and require the separation of the flanged ends of two joined pipes before the valve can be removed and replaced.

Another disadvantage of conventionally used check valves is that they are not quickly responsive to flow rates and do not form fluid tight seals when closed and have relatively high pressure drops.

An object of the present invention is to provide a novel check valve which is devoid of the abovementioned disadvantages and which is suitable for a wide variety of industrial applications.

A more specific object of the invention is to provide an industrial type check valve comprising a rubber diaphragm which bends along its diameter to form a hinge to make the valve quickly responsive to fluid flow and which makes a reliable seal when closed, - also which comprises relatively simple and inexpensive parts that can be maintained at minimum expense and which occupy a much smaller space than presently used valves.

Another object of this invention is to provide a novel check valve which, by the addition of a spacer ring, is adapted to fit varying diameter sizes of pipes without the necessity of stocking numerous check valve sizes for corresponding sizes of pipe, - therefore considerably reducing inventory requirements.

Another object of this invention is to provide a novel check valve that can be replaced without the necessity of separating the flanged ends of the interconnected pipes; also which may include a hand valve for manually closing the check valve, if desired.

Other objects and advantages will become more apparent from a study of the following description, taken with the accompanying drawings wherein:

FIG. 7 is an elevational view of a modification of the check valve embodying a metallic hinge;

FIG. 8 is an elevational view showing the opposite side of the valve illustrated in FIG. 7;

FIG. 9 is a cross-sectional view taken along line IX—IX of FIG. 7;

FIG. 10 is a cross-sectional view taken along line X—X of FIG. 7;

FIGS. 11 and 12 show the left and right hinge plates, respectively, of FIG. 7;

FIG. 13 is a cross-sectional view taken along line XIII—XIII of FIG. 11;

FIG. 14 is an elevational view of a further modification of the check valve embodying the present invention incorporating return springs for normally holding the valve in the closed position;

FIG. 15 is a side view of the valve shown in FIG. 14;

FIG. 16 is a cross-sectional view taken along line XVI—XVI of FIG. 14;

FIG. 17 is a cross-sectional view similar to FIG. 16 except showing the valve in the open instead of the closed position;

FIG. 18 is an elevational view of the rubber diaphragm 27 shown in FIGS. 14, 15 and 15;

FIG. 19 is a fragmentary, cross-sectional view showing the valve of FIGS. 14, 15 and 16 installed together with a spacer ring between flanges of adjoining pipes to pipes to enable lateral withdrawal and replacement of the valve assembly;

FIG. 20 is a side view of a modification of the valve assembly shown in FIG. 15 including a spacer ring;

Figure 1:
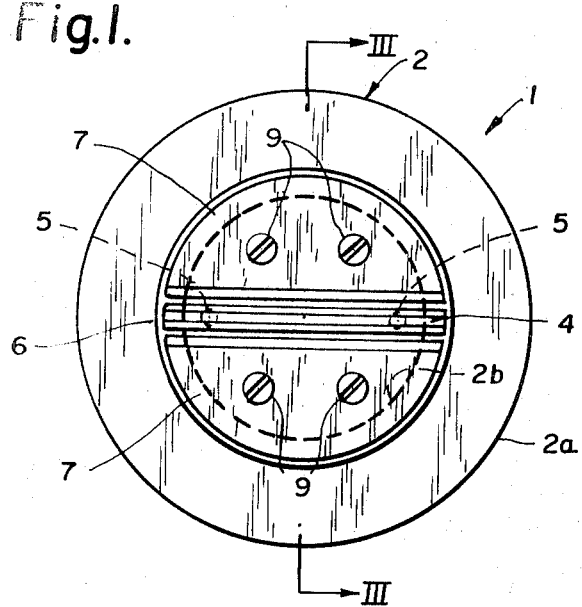
FIG. 1 is an elevational view of a check valve embodying the present invention.
Figure 2:
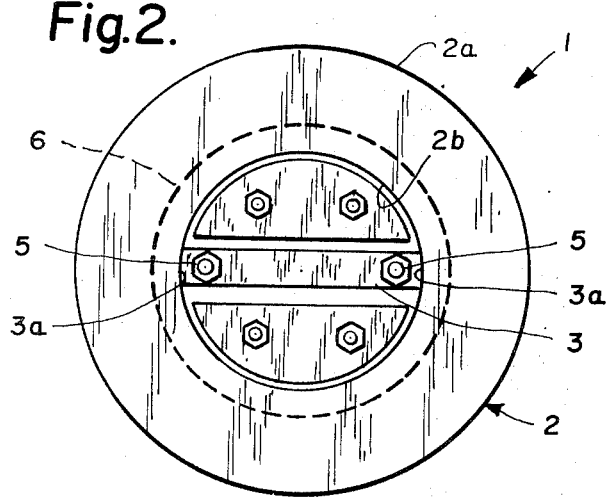
FIG. 2 is an elevational view of the opposite side of the check valve shown in FIG. 1.
Figure 3:
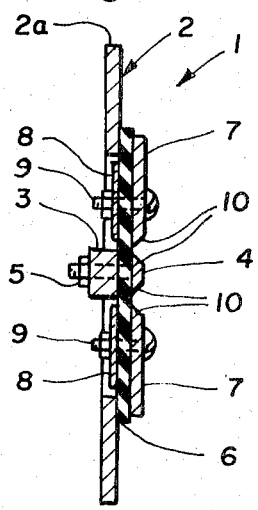
FIG. 3 is a cross-sectional view taken along line III—III of FIG. 1.
Figure 4:
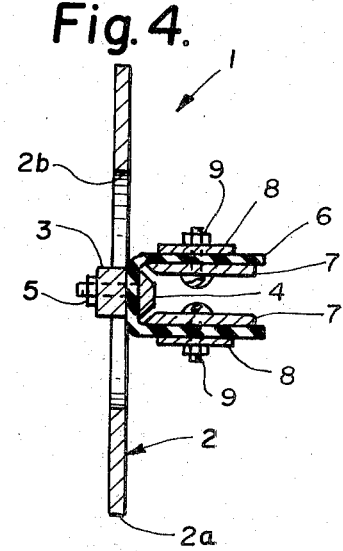
FIG. 4 is a cross-sectional view similar to FIG. 3 except showing the valve diaphragm flexed to the open position instead of the closed position.

Referring more particularly to FIGS. 1 to 4 inclusive of the drawing, numeral 1 generally denotes a valve assembly comprising an annular metal plate or ring 2 having an outer edge 2a and an inner edge 2b. Extending diametrically across the ring opening is a body member 3, as illustrated best in FIG. 2, which is integral with the ring 2. By means of a bolting element 4, shown best in FIGS. 1 and 2, and nuts 5 (FIG. 2), a valve diaphragm 6, of rubber or similar flexible material, is clamped along a diametrical portion thereof to hold it stationary. Along one half of the diaphragm, a substantially semi-circular stiffening plate 7 is bolted to a similar backing plate 8 by bolts 9. The edges of plates 7 and bolting element 4 are chamfered at 10 to enable full opening as shown in FIG. 4.

Similarly the other half of the diaphragm is stiffened by correspondingly denoted elements. Thus, when there is little or no valve flow toward the right, as viewed in FIG. 3, the valve is normally closed by the resiliency and tendency of the rubber diaphragm 6 to remain flat. However, upon a predetermined fluid flow to the right, the valve will open by flexing of the rubber diaphragm along hinge portions, as illustrated in FIG. 4.

Figure 5:
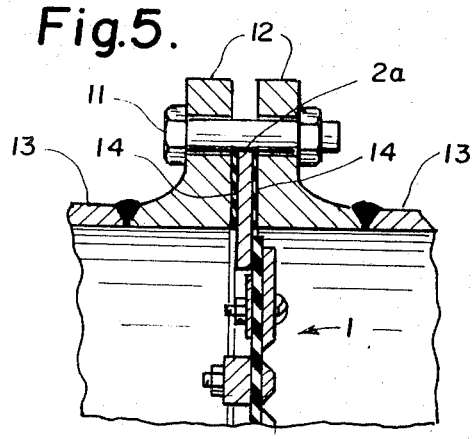
FIG. 5 is a fragmentary, cross-sectional view showing the valve of FIG. 3 mounted between flanges of interconnected pipes and centered by the bolts thereof.

FIG. 5 shows the above described valve mounted by interposed gaskets 14 to mating flanges 12 of adjoining interconnected pipes 13.

Figure 6:
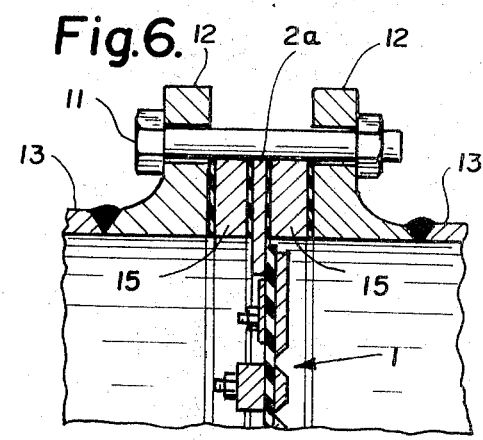
FIG. 6 is a view similar to FIG. 5 except showing the addition of spacer rings 15 to enable lateral removal of the valve without separating the flanges or pipes.

FIG. 6 is similar to FIG. 5 except that it includes a pair of spacing rings 15, 15 with interposed gaskets so as to enable lateral removal and replacement of the check valve, after the bolts 11 are removed, without the necessity of further separating flanges 12, 12 of the coupled pipes 13, 13.

By virtue of the assemblies shown in FIGS. 5 and 6, the outer edge 2a of the ring 2 rests against the shanks of bolts 11, which bolts are evenly spaced about a circular path coaxial with the valve assembly. Thus, the valve is centered properly, as well as firmly supported after the bolts 11 are tightened. It will be readily seen that the same valve assembly may be used on widely different sized pipes simply by changing ring 2 to provide different outer diameters. This is an outstanding advantage since large inventories for different valve sizes for different pipe sizes are not necessary, - therefore greatly reducing inventory costs.

FIGS. 7 to 13 inclusive show a modification of the valve which is similar to that illustrated in FIGS. 1 to 6 inclusive and like parts are denoted by the addition of a prime, - that is 2' corresponds to 2 etc.. The main feature of difference is that a metallic hinge joint is provided comprising integral hinge elements 17, 17 having registering holes 19, 19 on the left plate 7' (see FIGS. 11 and 12) and hinge elements 18, 18 with registering holes 19, 19 integrally attached to the right stiffening plate 7'. A hinge pin 20 extends through all said registering holes, as illustrated in FIGS. 7 and 9, whereby the two halves of the rubber diaphragm 6' are effectively hinged about the axis of pin 20 to enable movement to the open position as illustrated in dash lines in FIG. 10.

FIGS. 14 to 18 inclusive show a further modification of the invention embodying return springs for normally yieldingly holding the diaphragm halves in closed position. The valve assembly, generally denoted by numeral 20, comprises a ring 21 and a ring 25 interlocked by means of projections 24 integrally formed in ring 21 which fit into correspondingly shaped holes in ring 25 and extending through correspondingly shaped holes 32 in the rubber diaphragm 27, illustrated more clearly in FIG. 18. The valve opening of ring 21 is defined by the inner edge 23, which is of smaller diameter than the inner diameter of ring 25 to provide a seat for the outer edge of the diaphragm 27 (see FIGS. 16 and 19).

Stiffening semi-circular plates 33 and 34 sandwich substantially semi-circular portions of the rubber diaphragm 29 and are clamped together by rivets or bolts 35.

Return springs comprise central helically wound coil portions 38 and ends 39 resting against rings 33 so as to normally hold the valve in the closed position, as shown in FIG. 16. A left hand and a right hand spring are provided as shown in FIG. 14. These springs are mounted on a somewhat S rod or wire 36, welded to plate 25 and having a spaced portion 37 parallel to plate 25 and extending through the coil portions 38 of the return springs and terminating with a cotter pin 40 serving as a stop element.

In operation, assume the valve is in the normal closed position of FIG. 16 and that a substantial flow of fluid is exerted on the valve and moves to the left, as viewed in FIG. 16, the diaphragm 29 will then flex to the open position as shown in FIG. 17. Upon discontinuance of the flow, the valve will automatically move to the closed position shown in FIG. 16 aided by the action of the return springs.

FIG. 18 shows more clearly the shape of rubber diaphragm 27, including arcuate cut-outs 29 and 30 as well as holes 31 and 32 through which projections 24 and bolts 35 extend.

FIG. 19 shows the valve of FIGS. 14-18 assembled between two flanges 41, 41 of adjoining pipe 43, 43 together with a spacing ring 40 to enable the entire valve assembly to be laterally removed from and replaced with a new valve assembly when necessary, simply by loosening bolts 42 and then withdrawing laterally the valve assembly together with spacing ring 40.

FIG. 20 shows a modification similar to FIG. 15 except that ring 25' is thicker to permit lateral removal of the valve. Rod portions 36' and 37' are positioned within the confines of ring 25'.

Figure 21:
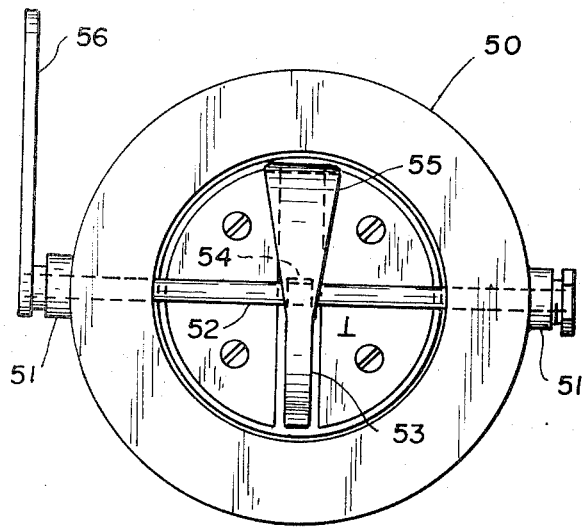
FIG. 21 is an elevational view of the check valve shown in FIGS. 1–3 in combination with a manual operating lever for manually closing the valve.
Figure 22:
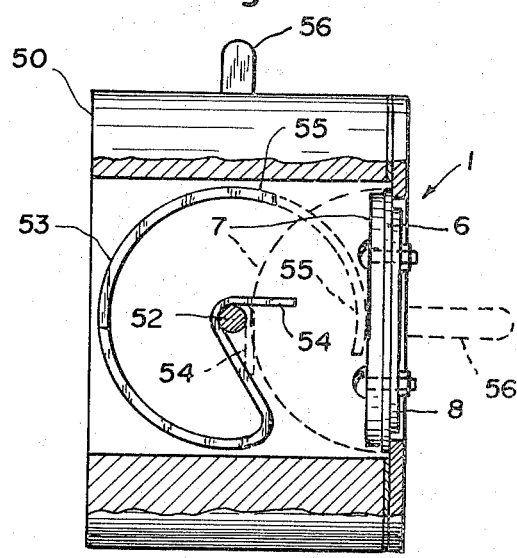
FIG. 22 is a longitudinal, cross-sectional view showing the valve of FIG. 21 in the open position, as illustrated in full lines.
Figure 24:
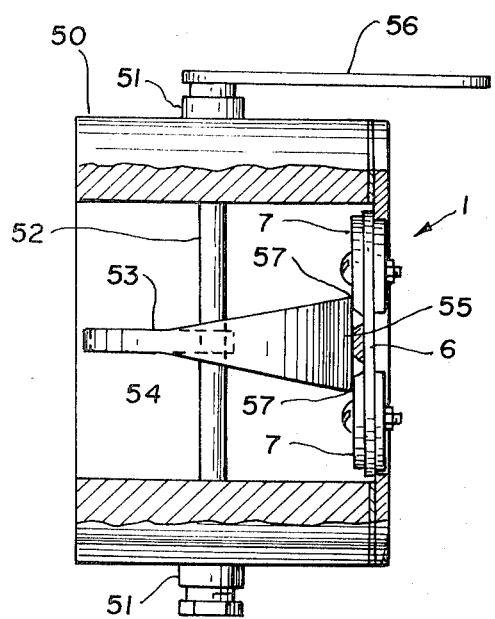

FIGS. 21 to 24 inclusive show a still further modification embodying a manually operated valve closing assembly which is applicable to all forms of valves hereinbefore described. The particular valve shown in FIGS. 1-4 is illustrated and generally denoted by numeral 1. Ring 50 has integral, diametrically opposite trunnions 51, 51 through which extends a pivot rod 52 integrally secured at one end to a manual operating lever 56. Spaced about and turning with rod 52 is a valve closing element 53 shaped as illustrated in FIG. 22 but having a progressive flare 55 in width, as best shown in FIG. 21.

Figure 23:
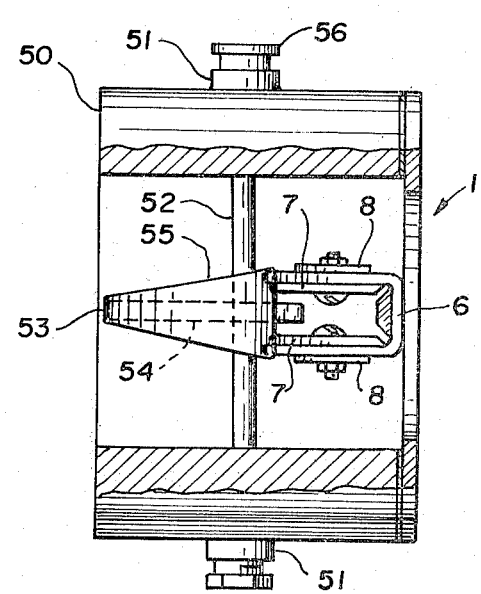
FIG. 23 is a top view, shown broken away, of the check valve of FIG. 22, illustrating the valve in the open position; and, FIG. 24 is a valve similar to FIG. 23 except showing the valve as being turned manually to the closed position.

FIGS. 21, 22 and 23 show the valve in its normal position, - that is, the open position wherein the operating element 53 is illustrated in full lines. However, as handle 56 is moved from the full line to the dotted line position of FIG. 22, the element 53 will be turned to the dotted line position so as to firmly hold the valve closed. However, when element 53 is turned, by means of handle 56, to the open position, as shown in FIG. 22 (full lines), the valve is permitted to open in response to fluid flow so as to move to the dotted line position, denoted by numeral 7, and flex, in the manner best illustrated in FIG. 23, to the open position.

Thus it will be seen that the present invention provides a highly efficient type of check valve made of simple and inexpensive parts that can be easily installed and removed for replacement, without the necessity of separating the flanges of interconnected pipes, - also which involves minimum maintenace and has very long life, considerably more than presently used industrial check valves; also, I have provided spacer means to provide an assembly that can be not only removed laterally without separating the flanges of interconnected pipes but which centers the valve without the necessity of having the bolts go through and weaken the outer ring portions of the valve; furthermore, I have provided a manual operating lever for closing the valve when desired.

While there has been described and illustrated several embodiments of the invention, it will be understood that these are by way of illustration only and that various changes and modifications may be contemplated in this invention and within the scope of the following claims.

What is claimed is:

1. For use in combination with annular flanged ends of two pipes which are clamped together by a plurality of bolts extending along a circular path of greater diameter than the outer diameter of said pipe, a check valve comprising a flat ring having a substantially greater outer diameter than inner diameter and which outer peripheral portion is adapted to be clamped between said pipe ends, a support extending diametrically across the inner diameter of said ring and integrally secured thereto, a detachable clamp, a disc shaped rubber diaphragm sandwiched between said diametrically extending support and said detachable clamp, stiffening segments fastened to substantially semi-circular portions of said diaphragm on opposite sides of said support, the outer peripheral portion of said rubber diaphragm being resiliently held in normally seated position on the inner peripheral portion of said ring, whereby fluid pressure flowing through said pipe in an unseating direction will effect pivotal flexing of said diaphragm adjacent and on opposite sides of said support to the open position of said valve and a pair of spacing rings sandwiched between said outer peripheral portion of said flat ring and said pipe flanged ends and being of sufficient thickness to allow lateral withdrawal of said valve without the necessity of separating said flanged ends, the outer peripheral surfaces of said flat ring and spacing rings contacting and being held coaxially of said pipes by said bolts.

2. A check valve as recited in claim 1 wherein said stiffening segments have integral hinge extensions, and a hinge pin extending through said extensions for providing a diametrical hinging axis of said diaphragm.

3. A check valve comprising a flat-ring, a diametrically extending support mounted thereon, a rubber diaphragm mounted on said diametrically extending support, the outer peripheral portion of said rubber diaphragm being normally seated on an inner peripheral portion of said ring, whereby fluid pressure will effect pivotal flexing of said diaphragm adjacent said support to the open position of said valve, together with stiffening segments fastened to substantially semi-circular portions of said diaphragm, together with a spring mounting element of somewhat S shape with one portion integrally secured to a second ring attached to said flat ring and another portion in spaced parallel relation thereto, said return springs comprising a pair of helically wound springs having coils wound in opposite directions and closely surrounding said last mentioned portion of said substantially S shaped element, each of said springs having an elongated extension at one end contacting one of said stiffening segments and an extension at the opposite end contacting the other of said stiffening segments for normally holding the valve in the closed position.

4. A check valve as recited in claim 3 in combination with flanged ends of two pipes which are clamped together by a plurality of bolts extending along the circular path of greater diameter than the outer diameter of said pipes, the outer periphery of said ring resting on and being centered by the shanks of said bolts in combination with said spacing ring means together with said rings being sandwiched and clamped between said flanges by said bolts and having sufficient overall thickness to permit lateral withdrawal from said joined pipes of said check valve and spacing ring.

* * * * *